United States Patent
Kubota

(10) Patent No.: US 6,797,884 B2
(45) Date of Patent: Sep. 28, 2004

(54) WATERPROOF COVER STRUCTURE OF ELECTRIC DISTRIBUTION BOX

(75) Inventor: Katsuhiro Kubota, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/698,364

(22) Filed: Nov. 3, 2003

(65) Prior Publication Data

US 2004/0089467 A1 May 13, 2004

(30) Foreign Application Priority Data

Nov. 12, 2002 (JP) .................................... P2002-328083

(51) Int. Cl.[7] ............................................... H02G 3/14
(52) U.S. Cl. ........................ 174/66; 174/67; 220/241; 439/139
(58) Field of Search ................ 174/66, 67; 220/241, 220/242; D13/177; D8/353; 439/139

(56) References Cited

U.S. PATENT DOCUMENTS

| | | |
|---|---|---|
| 4,665,654 A | 5/1987 | Stedron et al. |
| 5,274,194 A | 12/1993 | Belcher |
| 6,552,269 B1 * | 4/2003 | Conner .......................... 174/67 |
| 6,559,380 B2 * | 5/2003 | Soboleski ...................... 174/66 |
| 6,664,472 B2 * | 12/2003 | Saneto et al. .................. 174/66 |
| 6,693,240 B2 * | 2/2004 | Hieda ............................ 174/66 |

FOREIGN PATENT DOCUMENTS

| | | |
|---|---|---|
| JP | 55-129478 U | 9/1980 |
| JP | 55-129479 U | 9/1980 |
| JP | 56-81486 U | 7/1981 |
| JP | 9-216648 A | 8/1997 |
| JP | 2000-289540 A | 10/2000 |
| JP | 2000-316219 A | 11/2000 |

* cited by examiner

*Primary Examiner*—Dhiru R Patel
(74) *Attorney, Agent, or Firm*—Sughrue Mion, PLLC

(57) ABSTRACT

A waterproof cover structure of an electric distribution box includes a first cover member and a second cover member, the first cover member, includes a covering wall, a first side wall formed on the covering wall, and an inner wall formed on the covering wall with a gap between the first side wall and the inner wall, and having a straight wall and a slanting wall. The second cover member has a second side wall to be inserted into the gap. The covering wall has an opening communicating the gap with an exterior. An end portion of the second side wall is disposed above the slanting wall when the second side wall is inserted into the gap.

8 Claims, 5 Drawing Sheets

WATERPROOF COVER STRUCTURE OF ELECTRIC DISTRIBUTION BOX

BACKGROUND OF THE INVENTION

This invention relates to a waterproof cover structure of an electric distribution box in which water, applied from the upper side, is prevented from intruding through a joined portion of two covers.

FIGS. 6 and 7 show a first related waterproof cover structure of an electric distribution box (See Pages 3 to 5, FIGS. 2 and 3 of JP-UM-55-129479).

This electric distribution box 41 includes main cover 42 made of a synthetic resin, and base cover 43. Electrical parts (such as relays) and a circuit board (not shown) for connecting the electrical parts, and so on are received within the two covers. A wire 45, extending from the circuit board, is extended outwardly through a mouth portion 44 formed at lower sides of the two covers 42 and 43.

The main cover 42 includes a frame-like peripheral wall 46 formed at a peripheral edge of an opening thereof through a stepped portion 48. The base cover 43 includes a frame-like wall portion 47 (FIG. 7) for fitting into the peripheral wall 46. As shown in FIG. 7, an upper wall portion 46a of the main cover 42 has a downwardly-slanting wall 49, and a lower end 49a of the slanting wall 49 is disposed in proximity to an outer surface of an upper wall portion 50 of base cover 43, thereby preventing the intrusion of water applied from the upper side.

The electric distribution box 41 is mounted within an engine room of a vehicle. When water is applied to an upper portion of the main cover 42, for example, during the travel of the vehicle, the water flows along the slanting wall 49 to the wall portion 50 of base cover 43. Even when the water intrudes into the inside of the wall portion 46a through a gap between the slanting wall 49 and the wall portion 50, the frame-like peripheral wall 47 of base cover 43 prevents the water from intruding to a surface (area) 51 of joining of the two covers 42 and 43.

In the above related structure, however, waterdrops remained on the inner surfaces of the slanting wall 49 and frame-like peripheral wall 47 for a long period of time, and the waterdrops are formed into vapor, and there is a fear that this moisture intruded through the joining area 51 into the inside of the covers, and adversely affected the electrical parts and the circuit board within the covers. There is also a fear that the upper wall portion 50 of the cover 43 is deteriorated by waterdrops, and is lowered in strength.

FIG. 8 shows a second related electric distribution box mounted within an instrument panel of a vehicle.

This electric distribution box 61 includes main cover 62, and base cover (ECU cover) 63. A wiring board 8, an ECU (electronic control unit) 7 and so on are received within the two covers 62 and 63.

A peripheral wall 64 of the ECU cover 63 is joined to an outer surface of a peripheral wall 65 of the main cover 62, and the two covers are fixed to each other by retaining member (not shown) including retaining projections and engagement holes. The electric distribution box 61 is mounted in a vertical posture within the instrument panel.

The scattering of a large amount of waterdrops as within the engine room will not occur within the instrument panel. However, in some cases, there occurs the intrusion of a small amount of water, such as dew condensation on an air duct and water intruding through a welded portion of a body, and in such a case there is a fear that the water intruded into the inside of the covers through a gap between the upper wall 65 of the main cover 62 and the upper cover 64 of the ECU cover 63 as indicated by arrow D.

And besides, when the retaining projections (not shown) are formed on the inner surface of each vertical side wall of the ECU cover 63 while the engagement holes (not shown) are formed in each vertical side wall of the main cover 62, there is a fear that water, passed through the gap between the upper walls 64 and 65 of the two covers 62 and 63, is liable to intrude into the inside of the covers through the engagement holes.

SUMMARY OF THE INVENTION

It is therefore an object of the present invention to provide a waterproof cover structure of an electric distribution box in which waterdrops, resulting from water applied from the upper side, can be rapidly removed, thereby positively preventing the intrusion of the water into the electric distribution box.

In order to achieve the above object, according to the present invention, there is provided a waterproof cover structure of an electric distribution box, comprising:

a first cover member, including:
  a covering wall;
  a first side wall, formed on the covering wall; and
  an inner wall, formed on the covering wall with a gap between the first side wall and the inner wall, and having a straight wall and a slanting wall; and a second cover member, having a second side wall to be inserted into the gap, wherein the covering wall has an opening communicating the gap with an exterior; and wherein an end portion of the second side wall is disposed above the slanting wall when the second side wall is inserted into the gap.

With this construction, when attaching the two covers to each other, the second side wall of the second cover member is inserted into the gap between the side wall of the first cover member and the inner wall, and the edge portion of the second side wall of the second cover member moves over the inner wall, and is disposed in overlying relation to the slanting wall. The slanting wall is disposed beneath the edge portion of the second side wall of the second cover member. Water, applied onto the second side wall of the second cover member, flows through the gap between the first side wall of the first cover member and the inner wall, and drops from the edge portion of the second side wall of the second cover member onto the surface of the slanting wall, and is smoothly led to the exterior along the slanting wall. Therefore, waterdrops, resulting from water applied from the upper side, can be rapidly removed, thereby positively preventing the intrusion of the water into the electric distribution box. Therefore, the quality of the circuit parts and so on within the electric distribution box is maintained, and besides the strength of the synthetic resin-molded covers will not be deteriorated, and the discoloring of the covers is prevented.

Preferably, the straight wall is continuous with the slanting wall. The slanting wall is continuous with the cover wall.

Preferably, the end portion of the second side wall is disposed outwardly of the straight wall in a direction of inserting of the second side wall of the second cover member.

With this constructions, when attaching the two covers to each other, the edge portion of the second side wall of the second cover member moves over the inner wall, and is disposed above the slanting wall in opposed relation thereto. The slanting wall is disposed beneath the edge portion of the second side wall of the second cover member in opposed relation thereto. The edge portion of the second side wall of the second cover member and the inner wall are disposed in horizontally-spaced relation to each other, and the inner wall is disposed close to the inner side of the electric distribution box, while the edge portion of the second side wall of the second cover member is disposed adjacent to the outer side of the electric distribution box. Water, applied onto the second side wall of the second cover member, positively drops from the edge portion of the second side wall of the second cover member onto the surface of the slanting wall without flowing back to the inner wall, and is more smoothly led to the exterior along the slanting wall. Therefore, the intrusion of water into the electric distribution box is more positively prevented.

Preferably, a notch is formed on a vicinity of the second side wall of the second cover member. The inner wall is inserted into the notch when the second side wall is inserted into the gap.

With this construction, when attaching the two covers to each other, the inner wall of the first cover member is inserted into the notch on the second cover member, and the first side wall of the first cover member is laid on the second side wall of the second cover member. When the inner wall is engaged in the notch, the inner wall and the second side wall of the second cover member are accurately positioned relative to each other, and the inner wall is held in intimate contact with the second side wall of the second cover member. Therefore, the intrusion of water through a gap between the inner wall and the second side wall of the second cover member is more positively prevented.

Preferably, a rib is formed on the first cover member so as to interconnect the slanting wall with the first side wall of the first cover member.

With this construction, the gap between the side wall of the first cover member and the inner wall will not be much increased, and the accurate dimensions are maintained by the rib, and the intimate contact of the inner wall with the second side wall of the second cover member is enhanced. Therefore, the waterproof performance is enhanced. And besides, the structure of the cover around the gap is reinforced by the rib, so that the mechanical strength increases, and for example the force of locking the two covers to each other increases, and this eliminates a disadvantage that the locking of the covers is accidentally canceled by vibrations or others, so that water intrudes into the inside of the covers.

Preferably, a retaining projection is formed on the second cover member. An engagement wall portion for engaging with the retaining projection is formed on the first cover member.

With this construction, simultaneously when attaching the two covers to each other, the retaining projection slide over the engagement wall, and is engaged with the engagement wall, thereby firmly locking the two covers to each other. The retaining projection and the engagement wall are used in combination as the retaining member, and through hole (engagement hole) is not used as the retaining member, and this eliminates a disadvantage that water intrudes into the inside of the covers through such engagement hole. Therefore, the waterproof performance of the electric distribution box is Preferably, the first cover member is provided at each of opposite sides of the second cover member.

With this construction, the opposite sides of the second cover member are open, and circuit parts and so on can be efficiently mounted in the second cover member through the two openings. The two covers close the two openings in the second cover member. In each of the two covers provided respectively at the opposite sides of the second cover member, water is smoothly and positively led to the exterior by the inner wall and the slanting wall as described above. Particularly, water on the second side wall of the second cover member is efficiently and rapidly discharged by the slanting walls disposed respectively at the opposite sides, thereby positively preventing the water from intruding into the electric distribution box.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A preferred embodiment of the present invention will now be described in detail with reference to the drawings.

FIGS. 1 to 5 show one preferred embodiment of a waterproof cover structure of an electric distribution box of the invention.

Figure 1:
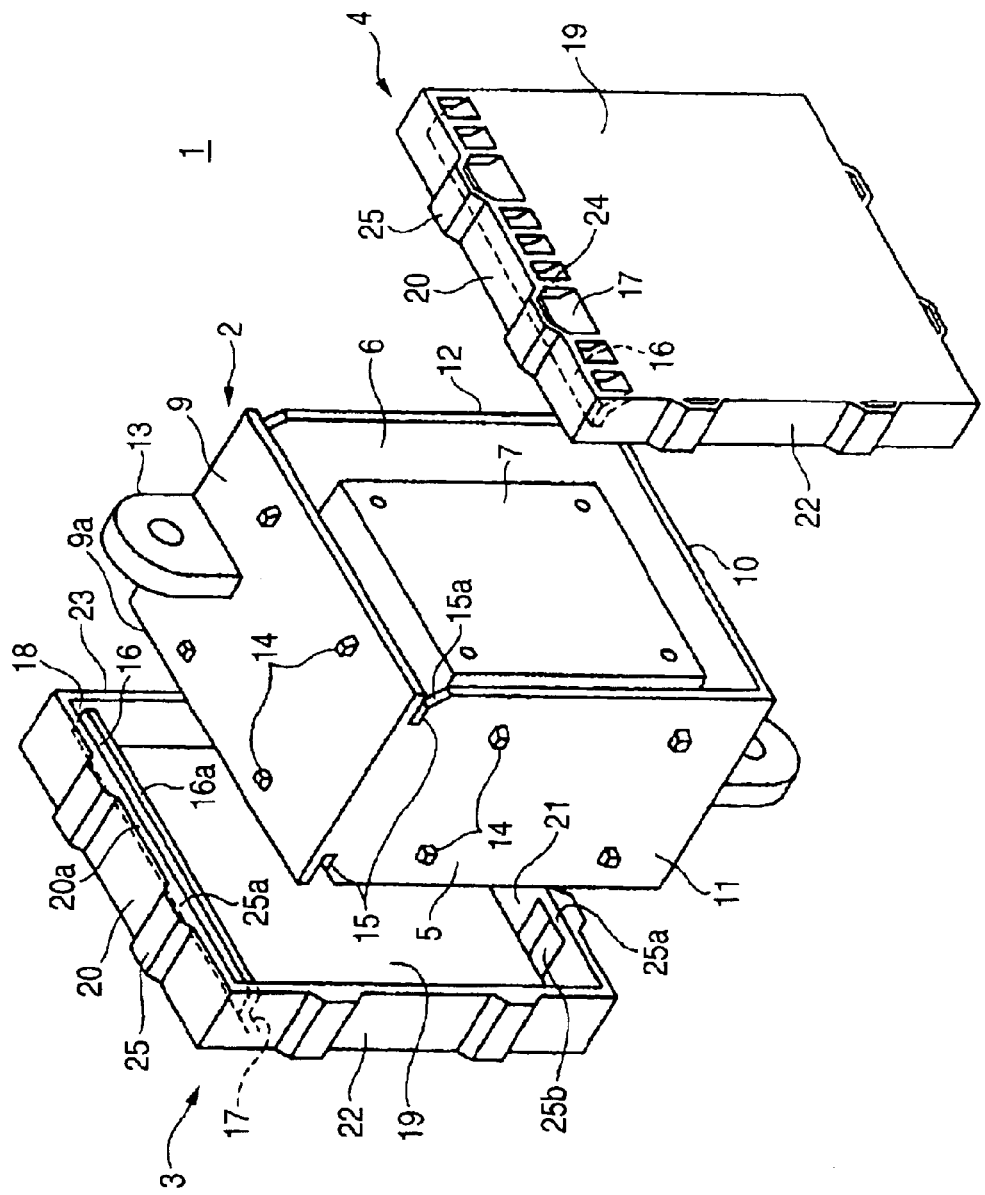
FIG. 1 is an exploded, perspective view of one preferred embodiment of a waterproof cover structure of an electric distribution box of the invention.

As shown in FIG. 1, the electric distribution box 1 includes an inner cover 2 of a rectangular tubular shape (frame-shape) made of a synthetic resin, a first outer cover 3 which is made of a synthetic resin, and closes one opening 5 of the inner cover 2, and a second outer cover (ECU cover) 4 which is made of a synthetic resin, and closes the other opening 6 of the inner cover 2, an ECU (an electronic control unit or an electronic control board) 7 received within the inner cover 2, and a wiring board 8 (FIG. 5) which is received within the inner cover 2, and is connected to or is independent of the ECU 7.

The inner cover 2 includes upper, lower, left and right wall portions 9 to 12 each perpendicularly intersecting the adjacent ones. A fixing bracket 13 is formed on each of the upper and lower wall portions 9 and 10, and front retaining projections 14 (disposed near to the front opening) and rear retaining projections 14 (disposed near to the rear opening) are formed on each of the upper and lower wall portions 9 and 10. Slit-like notches 15 are formed respectively in front and rear edges of each of the left and right wall portions 11 and 12 at an upper end portion thereof. Front retaining projections 14 and rear retaining projections 14 are formed on each of the left and right wall portions 11 and 12.

The brackets 13 are adapted to be fixed to a panel (instrument panel) (not shown) or the like of a vehicle. The retaining projections 14 are formed on outer surfaces of the wall portions 9 to 12, and serve to retain the two outer covers 3 and 4. Each of the notches 15 communicates with the corresponding opening 5, 6 and an internal space of the inner cover 2. An inner wall 16 (described later), formed at an upper portion of the outer cover 3, 4 is inserted into the notches 15. A slanting guide portion 15a is formed at an inlet portion of each notch 15.

The ECU 7 has various electronic parts (not shown) provided on an inner surface of the circuit board 7, and has an electronic control function for electrical equipments and accessories in the vehicle. The wiring board 8 (FIG. 5) includes an insulating board on which a plurality of wires are arranged in parallel or perpendicularly-intersecting relation to one another, and the wires are joined together by press-contacting terminals, and are connected to other parts such as fuses. Such an internal structure is merely one example, and the component parts within the inner cover 2 can be suitably selected in accordance with the position of installation of the electric distribution box 1 and the manner of use of the electric distribution box 1.

The two outer covers 3 and 4 for use with the inner cover 2 are basically identical to each other. The first outer cover 3 includes a vertical rectangular cover wall 19, and a peripheral wall (wall portions 20 to 23) formed on a peripheral edge of the cover wall 19 to assume a frame-like shape. A horizontal slit-like opening is formed at an upper end of the cover wall 19, and an upwardly-slanting wall 17 is formed integrally with and extends from the upper end of the cover wall 19, and further the horizontal inner wall 16 extends from the slanting wall 17, the slanting wall 17 and the inner wall 16 defining the lower side of the slit-like gap (opening or insertion space) 18. The peripheral wall 20, 21, 22, 23 of the outer cover is slightly longer than the peripheral wall 9, 10, 11, 12 of the inner cover 2, and is fitted on the outer surface of the peripheral wall 9, 10, 11, 12.

Figure 2:
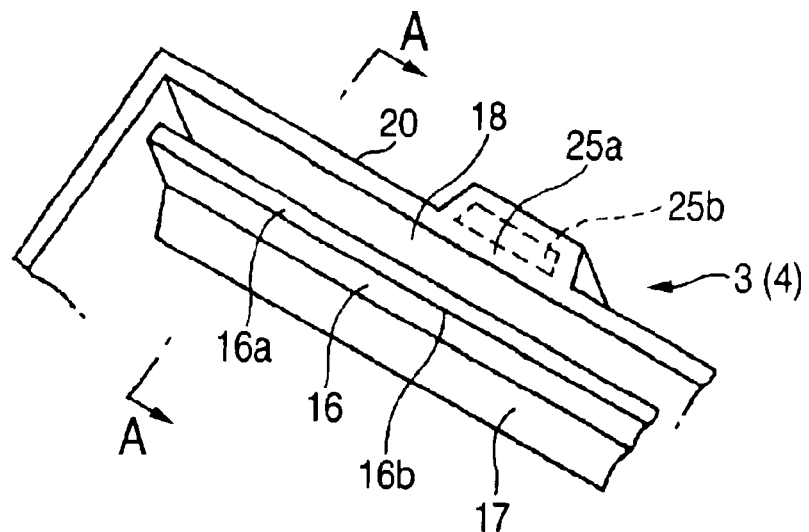
FIG. 2 is a perspective view showing an important portion of an outer cover of the electric distribution box.
Figure 3:
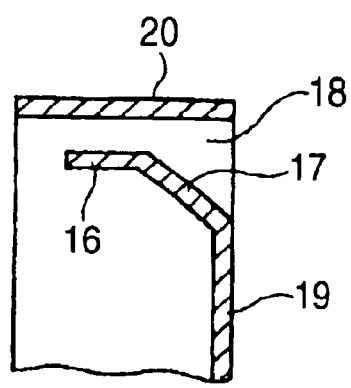
FIG. 3 is a cross-sectional view of the outer cover taken along the line A—A of FIG. 2.
Figure 4:
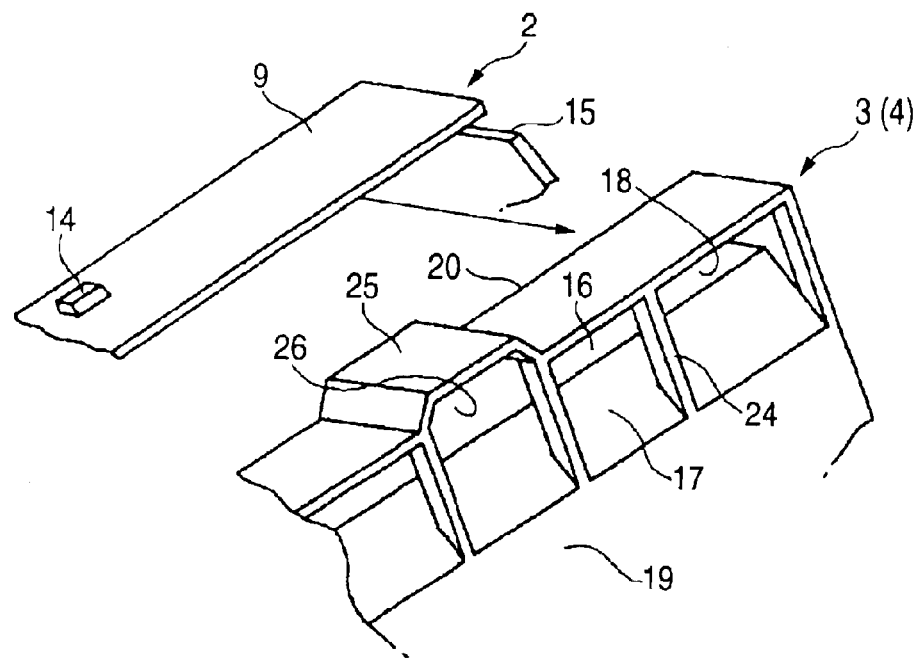
FIG. 4 is an exploded, perspective view showing important portions of the outer cover and inner cover.

As shown also in FIGS. 2 to 4, the horizontal inner wall 16 of the outer cover 3 is disposed parallel to the upper wall portion 20 of the peripheral wall thereof, and is shorter than the upper wall portion 20. A distal edge 16a of the inner wall 16 is disposed slightly inwardly of an inner side edge 20a of the upper wall portion 20, and the slanting wall 17 extends downwardly from a proximal edge 16b of the inner wall 16 in inclined relation thereto to assume a generally inverted V-shape as a whole (The slanting wall 17 intersects the inner wall 16 to assume a generally inverted V-shape). The slanting wall 17 is continuous with the vertical cover wall 19, and intersects this cover wall 19 to assume a generally recumbent V-shape. The gap (insertion space) 18 is formed between the continuous wall, defined by the inner wall 16 and the slanting wall 17, and the upper wall portion 20.

As shown in FIG. 4, a lower portion of the slanting wall 17 and the upper wall portion 20 are interconnected by a plurality of reinforcing ribs 24, and a window portion is formed between any two adjacent ribs 24, and communicates with the gap 18. The gap 18 extends through the outer cover 3 in the direction of the thickness of this outer cover 3. The ribs 24 have such a width that they will not prevent the insertion of the upper wall portion 9 of the inner cover 2 into the gap 18. The provision of the ribs 24 is not always necessary.

In FIG. 1, lock portions 25 are formed in an outwardly-bulging manner on each of the upper, lower, left and right wall portions 20 to 23. An internal space 26 (FIG. 4) of each lock portion 25 is open toward the cover wall 19, and is closed at the inner side edge (20a) of the peripheral wall, and this closed portion serves as an engagement wall (engagement portion) 25a for the corresponding retaining projection (retaining portion) 14 on the inner cover 2. The engagement wall 25a and an inner surface 25b of the lock portion 25 jointly form a perpendicularly-stepped portion.

The second outer cover (ECU cover) 4 is basically identical in construction to the first outer cover 3 (The second outer cover is different only in depth, wall thickness and so on). Therefore, the same reference numerals as used for the first outer cover 3 are used for the second outer cover, and detailed description of the second outer cover will be omitted. A slanting wall 17, an inner wall 16 and each lock portion 25 are disposed in symmetrical relation to those of the first outer cover 3, respectively. The second outer cover 4 covers the ECU 7, and therefore is called the ECU cover.

The ECU 7 and the wiring board 8 (FIG. 5) are mounted within the inner cover 2 as shown in FIG. 1, and in this condition the two outer covers 3 and 4 are attached to the inner cover 2. The peripheral wall 20, 21, 22, 23 of each of the outer covers 3 and 4 is fitted on the peripheral wall 9, 10, 11, 12 of the inner cover 2, and the horizontal inner wall 16 of each outer cover 3, 4 is inserted in the corresponding slit-like notches 15 in the inner cover 2. The engagement wall 25a of each lock portion 25 slides over the corresponding retaining projection 14, and is elastically deformed outwardly, and when the retaining projection 14 reaches the inner side of the engagement wall 25a, the engagement wall 25a is restored to be held in intimate contact with the peripheral wall 9, 10, 11, 12.

Figure 5:
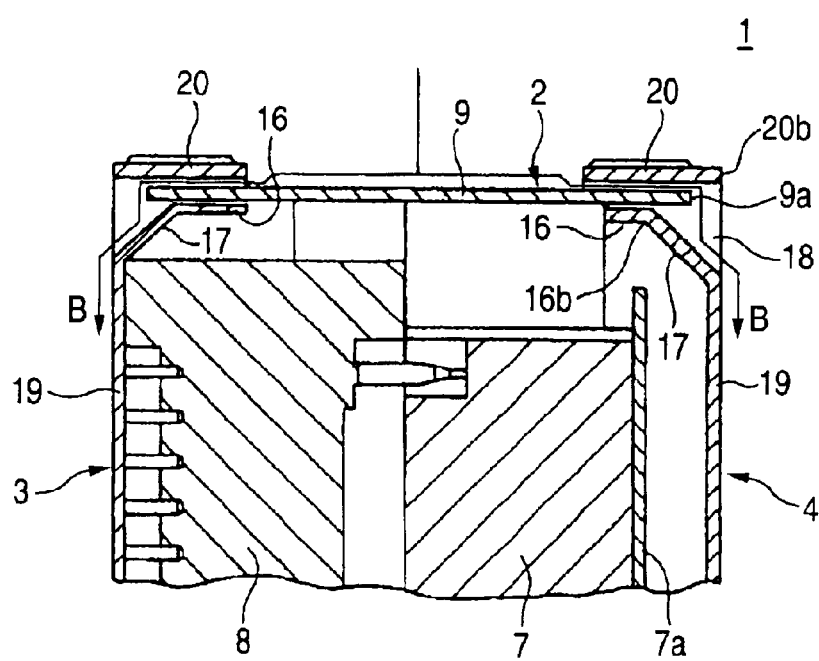
FIG. 5 is a vertical cross-sectional view of the electric distribution box.
Figure 6:
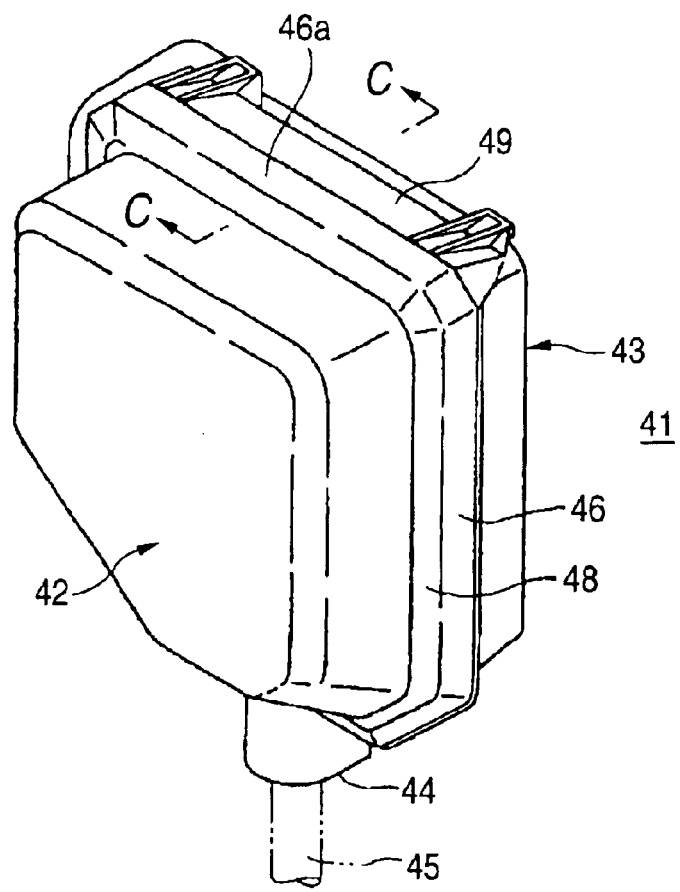
FIG. 6 is a perspective view showing the first related waterproof cover structure of an electric distribution box.
Figure 7:
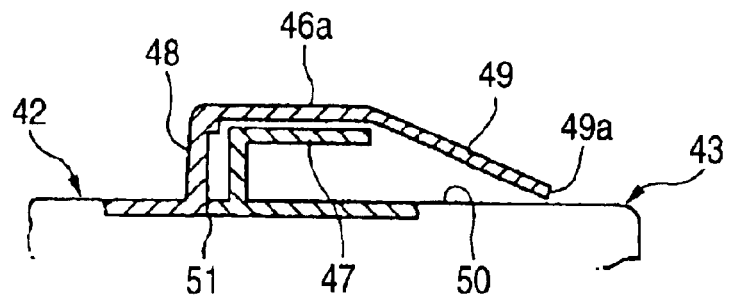
FIG. 7 is a cross-sectional view taken along the line C—C of FIG. 6.
Figure 8:
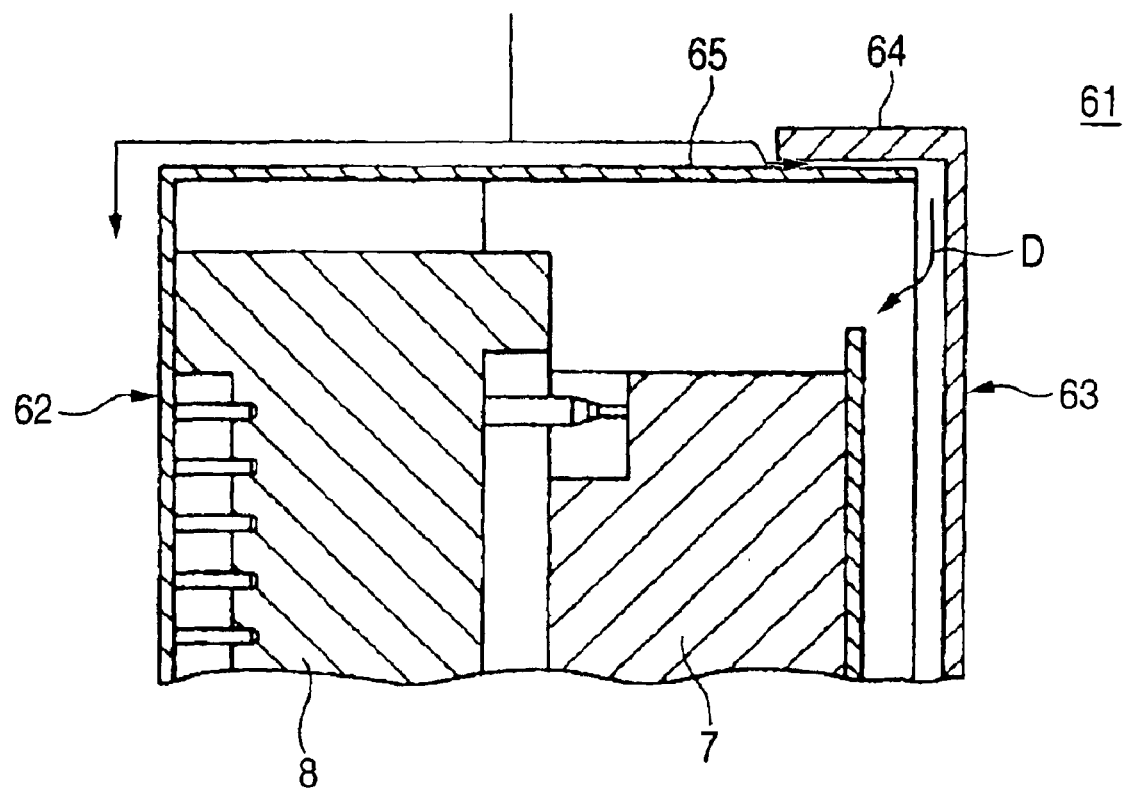
FIG. 8 is a vertical cross-sectional view of second related waterproof cover structure of an electric distribution box.

As shown in FIG. 5, the inner surface of the upper wall portion 20 of the peripheral wall of each of the two outer covers 3 and 4 is held in contact with the outer surface of the upper wall portion 9 of the inner cover 2 (A small gap may be formed therebetween), and the horizontal inner wall 16 of each of the two outer covers 3 and 4 is held in contact with (preferably in intimate contact with) the inner surface of the upper wall portion 9 of the inner cover 2. Preferably, the inner surfaces of the lower, left and right wall portions 21 to 23 (FIG. 1) of the peripheral wall of each of the outer covers 3 and 4 are held in intimate contact with the outer surface of the peripheral wall of the inner cover 2, and preferably the opposite side edges of the peripheral wall of the inner cover 2 are held in intimate contact with the inner surfaces of the cover walls 19 of the outer covers 3 and 4, respectively.

The upper wall portion 20 of each of the outer covers 3 and 4 contacts the upper wall portion 9 of the inner cover 2 deeper than the inner wall 16 (disposed below the upper wall portion 20) does, and the inner wall 16 contacts the upper wall portion 9 of the inner cover 2 within the range of the depth of the upper wall portion 20. The wall portion 9 of the inner cover 2 extends outwardly beyond the proximal edge 16b of the inner wall 16, and each side edge 9a of the wall portion 9 of the inner cover 2 is disposed in overlying relation to the downwardly-slanting wall 17 extending from the inner wall 16, and the side edge 9a of the wall portion 9 is disposed above a widthwise-central portion of the upper surface of the slanting surface 17 in opposed relation thereto. An outer edge 20b of the upper wall portion 20 of the outer cover 3, 4 (and hence the cover wall 19) is disposed outwardly of the side edge 9a of the wall portion 9, and the side edge 9a of the wall portion 9 is disposed within the opening 18.

With this construction, water, dropped onto the upper wall portion 9 of the inner cover 2 as indicated by arrows B in FIG. 5, flows through the gap between the upper wall portion 9 and the upper wall portion 20 of the outer cover 3, 4, and drops from the side edge 9a of the wall portion 9 of the inner cover 2 within the opening 18, and is smoothly led to the exterior along the outer surface of the slanting wall 17 of the outer cover 3, 4. Therefore, water on the wall portion 9 of the inner cover 2 is rapidly discharged, and will not collect (or remain) on the wall portion 9.

And besides, the lock member (the retaining projections 14 and the engagement walls 25a) are provided without forming any through holes in the inner cover 2, and this eliminates a disadvantage that water intrudes into the inside of the covers through such through holes. The engagement wall 25a seals the internal space of the lock portion 25, and therefore water will not intrude into the inside of the covers through the lock portions 25. With the above waterproof structure, water, applied from the upper side, is positively prevented from intruding into the electric distribution box 1, and also the deterioration of the wall portions of the covers 2, 3 and 4 due to the stagnation of water is positively prevented.

In the above embodiment, although the opposite sides of the inner cover 2 are open (as at 5 and 6) so that the ECU 7 and the wiring board 8 can be efficiently mounted within this inner cover, the provision of the opening 5 can be omitted, in which case this side of the inner cover is sealingly closed by an integral wall portion (not shown), and only the other opening 6 is sealingly closed by the outer cover 4, and the above waterproof structure is applied to this construction. The electric distribution box 1 does not always need to be mounted on the instrument panel, but can be mounted on various portions of the vehicle.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A waterproof cover structure of an electric distribution box, comprising:
   a first cover member, including:
      a covering wall;
      a first side wall, formed on the covering wall; and
      an inner wall, formed on the covering wall with a gap between the first side wall and the inner wall, and having a straight wall and a slanting wall; and
   a second cover member, having a second side wall to be inserted into the gap,
   wherein the covering wall has an opening communicating the gap with an exterior; and
   wherein an end portion of the second side wall is disposed above the slanting wall when the second side wall is inserted into the gap.

2. The waterproof cover structure as set forth in claim 1, wherein the straight wall is continuous with the slanting wall; and
   wherein the slanting wall is continuous with the covering wall.

3. The waterproof cover structure as set forth in claim 1, wherein the end portion of the second side wall is disposed outwardly of the straight wall in a direction of inserting of the second side wall of the second cover member.

4. The waterproof cover structure as set forth in claim 1, wherein a notch is formed on a vicinity of the second side wall of the second cover member; and
   wherein the inner wall is inserted into the notch when the second side wall is inserted into the gap.

5. The waterproof cover structure as set forth in claim 1, wherein a rib is formed on the first cover member so as to interconnect the slanting wall with the first side wall of the first cover member.

6. The waterproof cover structure as set forth in claim 1, wherein a retaining projection is formed on the second cover member; and
   wherein an engagement wall portion for engaging with the retaining projection is formed on the first cover member.

7. A waterproof cover structure of an electric distribution box, comprising:
   two first-cover members, each first-cover member including:
      a covering wall;
      a first side wall, formed on the covering wall; and
      an inner wall, formed on the covering wall with a gap between the first side wall and the inner wall, and having a straight wall and a slanting wall; and
   a second-cover member, having a second side wall to be inserted into the gap of one of the first-cover members and into the gap of another of the first-cover members;
   wherein the covering wall of each of the first-cover members has an opening communicating the gap with an exterior; and
   wherein a first end portion of the second side wall is disposed above the slanting wall of the one of the first-cover members when the second side wall is inserted into the gap of the one of the first-cover members, and
   wherein a second end portion of the second side wall is disposed above the slanting wall of the other of the first-cover members when the second side wall is inserted into the gap of the other of the first-cover members.

8. The waterproof cover structure as set forth in claim 7, wherein the one of the first-cover members is provided at a first side of the second-cover member and the other of the first-cover members is provided at a second side of the second-cover member, said second side of said second-cover member opposing the first side of the second-cover member.

* * * * *